United States Patent [19]

Stoll

[11] 4,280,741
[45] Jul. 28, 1981

[54] PISTON ROD SUPPORT

[76] Inventor: Kurt Stoll, Lenzhalde 72, D-7300 Esslingen, Fed. Rep. of Germany

[21] Appl. No.: 68,319

[22] Filed: Aug. 21, 1979

[30] Foreign Application Priority Data

Sep. 5, 1978 [DE] Fed. Rep. of Germany ....... 2838594

[51] Int. Cl.³ ........................ F16C 27/02; F16C 33/72
[52] U.S. Cl. .................................... 308/3.5; 277/152; 308/36.1; 308/237 A
[58] Field of Search ................ 277/152; 308/3.5, 4 R, 308/26, 36.1, 36.5, 237 R, 237 A, 239

[56] References Cited

U.S. PATENT DOCUMENTS

| 3,527,587 | 9/1970 | Clark et al. | 308/3.5 |
| 3,776,610 | 12/1973 | Harvey | 308/3.5 |

Primary Examiner—Frederick R. Schmidt
Attorney, Agent, or Firm—Blanchard, Flynn, Thiel, Boutell & Tanis

[57] ABSTRACT

A mechanism for supporting a piston rod in a cylinder head includes a bearing bushing surrounding the piston rod and secured in a through opening in the cylinder head. A sleeve of elastic material is arranged between the bearing bushing and the wall of the through opening and surrounds the bearing bushing.

7 Claims, 2 Drawing Figures

PISTON ROD SUPPORT

FIELD OF THE INVENTION

The invention relates to a mechanism for supporting a piston rod in a cylinder head with a bearing sleeve which surrounds the piston rod and is secured in a through opening of the cylinder head.

BACKGROUND OF THE INVENTION

Such piston rod supports are known in pneumatic and hydraulic working cylinders, in which the piston and with it the piston rod are moved back and forth by suitably loading the piston with a pneumatic or hydraulic working medium. Said movement is often used to drive an article which is fixedly connected to the outer end of the piston rod. In this case one obtains for the unit which is formed by the piston and the piston rod a so-called three-point bearing, since the piston is guided in the cylinder and the piston rod is guided in the cylinder head and in addition the piston rod is secured on the article to be driven. This three-point bearing represents a redundancy in guidance, which in previous working cylinders, in which the piston rod is supported rigidly in the cylinder head, leads to considerable disadvantages.

If for example the axis of the movement of the driven article does not exactly coincide with the cylinder axis, the piston rod is slightly tilted during its back and forth movement, which results in a canting of the piston rod in the area of the bearing bushing. This results in increased friction, which produces not only wear of the bearing bushing, but also an energy loss. This friction also brings about, particularly at low speeds, a suddenly occurring, or jerky, movement of the piston rod.

Therefore, the basic purpose of the present invention is to produce a piston rod support, in which a canting of the piston rod on the bearing bushing is avoided.

This purpose is attained inventively by arranging a sleeve of elastic material between the bearing bushing and the wall of the through opening, which elastic sleeve encloses the bearing bushing.

In this manner one obtains so to speak a floating support of the bearing bushing and thus also of the piston rod in the through opening, so that the piston rod tilts as permitted by an elastic deformation of the elastic sleeve and can be adjusted to the axis of movement of the driven article, without canting of the piston rod with respect to the bearing bushing.

Advantageously, the sleeve projects axially beyond both sides of the bearing bushing, wherein the two projecting end sections of the sleeve are constructed as seals which rest on the piston rod. Thus in this exemplary embodiment the sleeve serves not only for supporting the bearing bushing, but it forms also an inner and outer seal, of which the outer seal serves, aside from its sealing action, also to wipe off dirt particles from the piston rod.

The two end sections of the sleeve can radially grip over the ends of the bearing bushing, wherein the two end sections of the sleeve together with the center sleeve section, which extends between them, define a recess which receives the bearing bushing, so that the bearing bushing is also held securely in axial direction by the sleeve.

If the bearing bushing is held in a snap fit in the recess, the bearing bushing can be inserted simply and yet permanently into the sleeve. In this case it is also possible, depending on use conditions, to insert bearing bushings of different material into the same sleeve. If necessary it is also possible to easily take apart the sleeve and the bearing bushing, so that for example a worn sleeve can be replaced without replacing the bearing bushing.

A further advantageous measure consists in the two end sections of the sleeve being constructed as lip seals, in which each end section has a leg forming a sealing lip, which leg is directed away from the bearing sleeve and extends slightly inclined inwardly toward the piston rod.

BRIEF DESCRIPTION OF THE DRAWINGS

Exemplary embodiments of the invention will now be described in connection with the drawing, in which.

DETAILED DESCRIPTION

Figure 1:
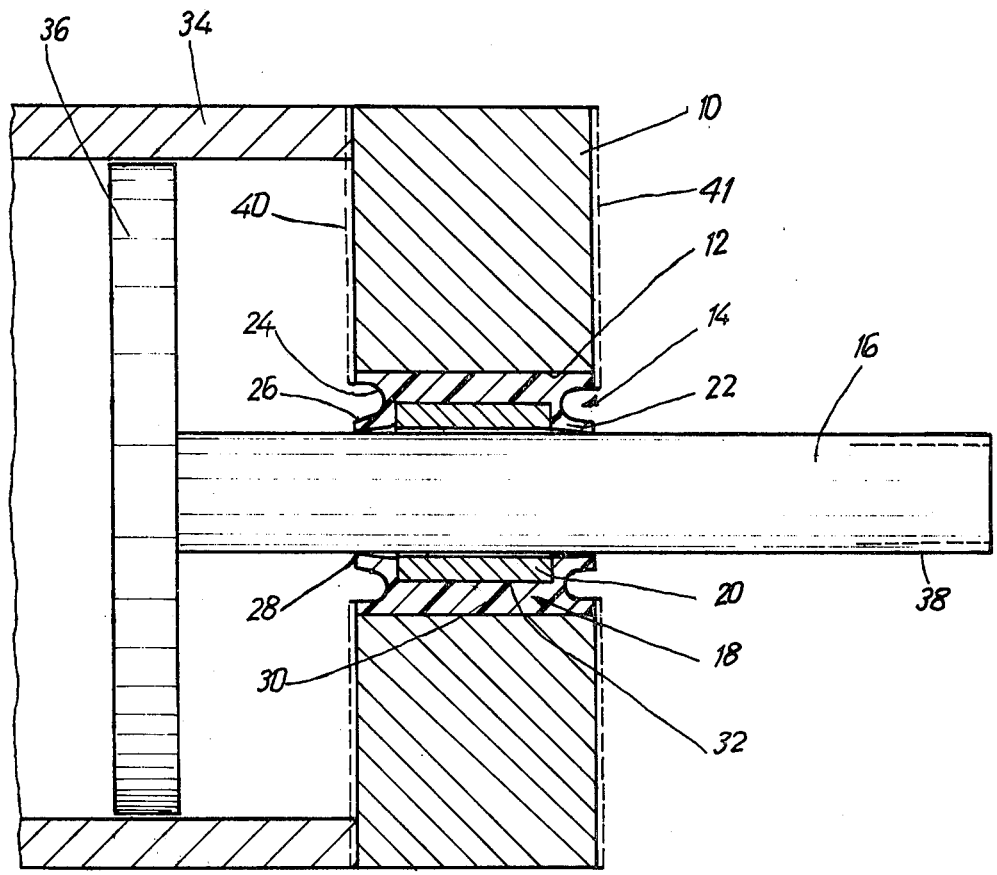
FIG. 1 is a fragmentary longitudinal cross-sectional view of a working cylinder with an inventive piston rod support.

The working cylinder which is illustrated in FIG. 1 has a cylinder head 10 as a front-side closure, which is connected to the cylinder wall 34 in any conventional manner, for example by screws (not shown). A piston 36 is guided inside of the working cylinder, which piston is connected fixedly to a piston rod 16. Said piston rod 16 penetrates through a through opening 12 of the cylinder head 10. The outer end 38 of the piston rod 16 is threaded for fastening an article, or load, which is to be driven by the working cylinder.

The piston rod 16 is supported and guided in the cylinder head 10 with the help of a device 14, which comprises a bearing bushing 20 which receives the piston rod. The bearing bushing consists for example of a sintered material, a plastic material of low sliding friction, bearing bronze or a different suitable bearing material. A sleeve 18 of elastic material, for example of rubber, is arranged between the bearing bushing 20 and the wall of the through opening 12, which sleeve encloses the bearing bushing 20. Due to this elastic sleeve, the bearing bushing 20 rests over its entire length always on the piston rod, even when the piston rod is slightly tilted with respect to the cylinder head 10, since the tilting is absorbed by the elastic sleeve.

The sleeve 18 of the exemplary embodiment illustrated in FIG. 1 has end sections 22, 24 which are formed in one piece with the sleeve 18, and by which the sleeve 18 axially projects on both ends over the bearing bushing 20. Said end sections 22, 24 are constructed as seals, here as lip seals, which rest on the piston rod 16. Both the outer end section 22 and the inner end section 24 have for this purpose a leg 26 constituting a sealing lip, which extends away from the bearing bushing and is slightly inclined upwardly toward the piston rod 16. Of these two sealing lips 26, the sealing lip of the sleeve inner end section 24 serves to seal off the inside of the cylinder, while the sealing lip of the sleeve outer end section 22 serves mainly for wiping off of dirt particles from the piston rod 16, when same is moved into the cylinder. The sealing action of the sealing lip of the inner end section 24 is increased additionally by its sealing edge 28 being pressed against the piston rod 16 not only by its own elastic pretension but also by the pressure existing in the cylinder.

The two end sections 22, 24 of the sleeve 18 radially grip over the bearing bushing 20, so that the two end sections 22, 24, together with the sleeve section 30 which extends between them, define a recess 32 which receives the bearing bushing 20. The bearing bushing 20 is positioned without clearance in the axial direction in said recess 32. The bearing bushing 20 is thereby seated with a snap fit in the recess 32, such that the sleeve 18 and the bearing bushing 20 are connected releasably, but still fixedly to one another. This type of connection is substantially less expensive than a connection which is for example created by vulcanization.

During installation it is possible to insert the bearing bushing 20 into the sleeve 18 by elastic bending of such sleeve 18, with the parts 18 and 20 still outside of the cylinder head 10. Thereafter, the mechanism 14 formed by these two parts 18 and 20 is introduced into the through opening 12 of the cylinder head. Fastening of the mechanism 14 in the cylinder head 10 can take place in various ways, for example with the help of fastening plates 40, 41 shown in broken lines and placed from both ends onto the cylinder head 10 and which radially project into overlapping relation with the sleeve 18 and fix same axially of the cylinder head 10.

Figure 2:
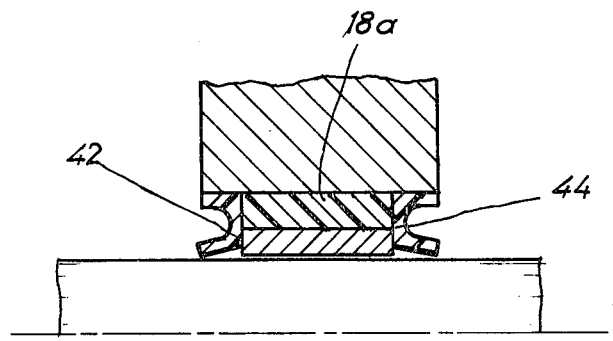
FIG. 2 illustrates a modification of the piston rod support according to FIG. 1.

FIG. 2 illustrates in a fragmentary view a modification of the piston rod support. The only difference from the embodiment of FIG. 1 is that the sleeve 18a does not have end sections formed in one piece thereon. Rather, separate seals 42, 44 are provided which have approximately the same design as the end sections 22, 24 of the sleeve 18 of FIG. 1.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a piston-cylinder mechanism including a cylinder, a pressure fluid actuated piston movable back and forth in said cylinder, a cylinder head which closes off the cylinder at one end thereof, a piston rod secured on the piston, said piston rod penetrating through a through opening in said cylinder head for carrying out a working movement, a bearing and sealing and stripping sleeve device located in the through opening between its peripheral wall and the piston rod, said sleeve device encircling said piston rod and being axially fixed in said through opening for sealing off the cylinder chamber and for wiping dirt particles off from the piston rod, said sleeve device having at its two ends, respectively, a sealing lip and a sealing and stripping lip each bearing on the piston rod, the improvement comprised in that the sleeve device has two parts, the first part being an elongate inner bearing bushing of a bearing material and the second part being an elongate outer sleeve of elastic material, said elastic outer sleeve being axially longer than the bearing bushing and having a pair of end sections which project axially beyond the bearing bushing and project radially inwardly and respectively form the sealing lip and the sealing and stripping lip, the bearing bushing being positioned axially clearance-free in a radially shallow recess of the elastic outer sleeve between the two lips thereof and being held in a snap fit therebetween, said elongate bearing bushing being of length substantially exceeding its radial thickness and substantially exceeding the axial length of said lips, the axial length of said elastic sleeve substantially exceeding the radial thickness thereof.

2. A mechanism according to claim 1, wherein the maximum radial thickness of said elastic sleeve is substantially less than the axial extend of said bearing bushing.

3. A mechanism according to claim 2, wherein the axial length of said bearing bushing exceeds the diameter of said piston rod.

4. A mechanism according to claim 3, wherein said bearing bushing is an elongate, thin-walled cylindrical shell, said shell being axially flanked by L-shaped portions of the end sections of said elastic sleeve, each said L-shaped portion having a substantially axially extending leg defining the corresponding said lip and a radially extending leg mounting said lip on said elastic sleeve, said radial leg being no longer than said axial leg.

5. A mechanism according to claim 2, wherein the radial thickness measured through said elongate bearing bushing and the surrounding part of said elastic sleeve is less than the piston rod diameter.

6. A mechanism according to claim 1, wherein each lip is directed away from the bearing bushing and extends slightly inclined inwardly toward the piston rod.

7. A mechanism according to claim 1, in which said elastic sleeve is made up of axial end sections formed separately from the central portion of said elastic sleeve, said end sections being oppositely axially opening, substantially C-shaped cross-section rings.

* * * * *